US012440049B2

(12) United States Patent
Hua

(10) Patent No.: US 12,440,049 B2
(45) Date of Patent: Oct. 14, 2025

(54) FLOWER STAND AND ITS CLAMPING STRUCTURE

(71) Applicant: KAISA USA, Inc., McKenney, VA (US)

(72) Inventor: Wen Hua, Chester, VA (US)

(73) Assignee: KAISA USA, Inc., McKenney, VA (US)

( * ) Notice: Subject to any disclaimer, the term of this patent is extended or adjusted under 35 U.S.C. 154(b) by 237 days.

(21) Appl. No.: 18/216,213

(22) Filed: Jun. 29, 2023

(65) Prior Publication Data

US 2025/0000284 A1 Jan. 2, 2025

(51) Int. Cl.
*A47G 7/04* (2006.01)
*A47G 7/02* (2006.01)

(52) U.S. Cl.
CPC ............. *A47G 7/041* (2013.01); *A47G 7/025* (2013.01)

(58) Field of Classification Search
CPC ........ A47G 7/044; A47G 7/025; A47G 7/041; E04H 13/003; E04H 13/001
See application file for complete search history.

(56) References Cited

U.S. PATENT DOCUMENTS

| | | | | |
|---|---|---|---|---|
| 1,596,812 A | * | 8/1926 | Curtis | A61G 17/045 |
| | | | | 211/96 |
| 2,470,890 A | * | 5/1949 | Goodpasture | A47K 10/185 |
| | | | | 248/302 |
| 2,714,728 A | * | 8/1955 | Bloch | A47K 3/001 |
| | | | | 248/231.21 |
| 3,089,597 A | * | 5/1963 | Kaplan | B60R 7/084 |
| | | | | 248/905 |
| 3,511,461 A | * | 5/1970 | Clark | E04H 13/001 |
| | | | | 248/311.2 |
| 4,033,538 A | * | 7/1977 | Levy | D06F 57/12 |
| | | | | 211/119.004 |
| 4,697,776 A | * | 10/1987 | Edson | A47F 5/01 |
| | | | | 248/302 |
| 4,702,521 A | * | 10/1987 | Bae | A47C 7/42 |
| | | | | D6/403 |
| 5,009,380 A | * | 4/1991 | Fee | F16M 13/022 |
| | | | | 248/302 |

(Continued)

FOREIGN PATENT DOCUMENTS

| | | | | | |
|---|---|---|---|---|---|
| EP | | 0913543 A1 | * | 5/1999 | ........... E04H 13/003 |
| WO | WO-0215671 A1 | * | 2/2002 | ............. A47G 7/044 |
| WO | WO-2012063067 A1 | * | 5/2012 | ............. F16B 21/02 |

*Primary Examiner* — Monica L Perry
(74) *Attorney, Agent, or Firm* — WPAT, PC

(57) ABSTRACT

A flower stand, comprising: a first clamping structure, further comprises M first open frame structure and M first leg structure, where M is a natural number, wherein the M first leg structure is configured for touching a first side of the fence; a second clamping structure, further comprises N second open frame structure and N second leg structure, where N is a natural number, wherein the N second leg structure is configured for touching a second side of the fence, the first and the second sides are opposite sides of the fence, wherein the first and the second clamping structures are in opposite directions; and one or more elastic components configured for connecting the M first open frame structure and the N second open frame structure.

22 Claims, 7 Drawing Sheets

(56) References Cited

U.S. PATENT DOCUMENTS

| | | | | |
|---|---|---|---|---|
| 5,240,214 A * | 8/1993 | Birnbaum | ............... | F16M 11/12 248/214 |
| 5,269,095 A * | 12/1993 | Helfman | ................ | A47G 7/044 47/65.5 |
| D383,916 S * | 9/1997 | Richards | ........................ | D6/403 |
| 5,687,515 A * | 11/1997 | Rodrigues | ............. | E04H 13/003 52/103 |
| D393,159 S * | 4/1998 | Richards | ........................ | D6/403 |
| 5,779,206 A * | 7/1998 | Harris | .................... | A47B 96/06 248/214 |
| 6,050,532 A * | 4/2000 | Paul | ....................... | A47G 7/044 47/68 |
| 6,168,125 B1 * | 1/2001 | Winger | ................... | A47H 1/144 248/48.1 |
| 6,678,975 B1 * | 1/2004 | Renosky | ............... | E04H 13/001 47/41.12 |
| 6,854,692 B1 * | 2/2005 | Winkel | ............... | E04D 13/0725 248/48.1 |
| D568,727 S * | 5/2008 | Walker | ........................ | D8/380 |
| 7,735,800 B2 * | 6/2010 | Lunato | ................... | A47G 7/044 47/68 |
| 7,891,318 B2 * | 2/2011 | Wilson | ................. | A01K 5/0135 119/475 |
| 8,523,118 B2 * | 9/2013 | Weder | ................. | A61G 17/045 248/432 |
| 9,010,038 B1 * | 4/2015 | Stearns | ................. | F16M 13/02 52/173.1 |
| 9,307,700 B1 * | 4/2016 | Schmitt | ................. | E04H 13/001 |
| 10,568,445 B1 * | 2/2020 | Green | .................... | A47G 7/041 |
| 10,898,020 B2 * | 1/2021 | Lee | .................... | A47G 25/0614 |
| 11,864,679 B1 * | 1/2024 | Holtschlag | ............. | A47G 7/044 |
| 2006/0219853 A1 * | 10/2006 | Molina | ................. | A47G 7/044 248/219.4 |
| 2008/0276503 A1 * | 11/2008 | Johnson | ................ | E04H 13/003 40/124.5 |
| 2009/0001035 A1 * | 1/2009 | Mulholland | .......... | A47F 7/0078 211/85.23 |
| 2012/0318936 A1 * | 12/2012 | Lutz | ....................... | A47G 7/041 248/121 |
| 2016/0353877 A1 * | 12/2016 | Brus | ....................... | A47B 5/02 |
| 2016/0376809 A1 * | 12/2016 | McPeak | ................ | F21V 21/088 362/145 |
| 2018/0163919 A1 * | 6/2018 | Eckhart | ................... | G09F 17/00 |

* cited by examiner

FLOWER STAND AND ITS CLAMPING STRUCTURE

FIELD OF THE INVENTION

The present invention relates to flower stand, and more particularly, to a flower stand with clamping structures being deposited on top of a fence or a stone.

BACKGROUND OF THE INVENTION

Flower and plant decorations are important parts of modern life. In some ceremonies, flower and plant decorations are almost mandatory. Usually, flowers and plants are placed on flower stands on the ground or a platform. However, if people want to place flowers and plants on top of thick fences or tombstones, traditional flower stands cannot stand on top of them firmly. Hence, there exists a need to provide a flower stand which can be deposited on top of a fence or a stone (e.g., tombstone).

SUMMARY OF THE INVENTION

An objective of the present invention is to provide a flower stand and its clamping structures. The flower stand can be firmly deposited on top of a fence with supports of the two clamping structures.

According to an embodiment of the present application a flower stand being deposited on top of a fence is provided. The flower stand, comprising: a first clamping structure, further comprises M first open frame structure and M first leg structure, where M is a natural number, wherein the M first leg structure is configured for touching a first side of the fence; a second clamping structure, further comprises N second open frame structure and N second leg structure, where N is a natural number, wherein the N second leg structure is configured for touching a second side of the fence, the first and the second sides are opposite sides of the fence, wherein the first and the second clamping structures are in opposite directions; and one or more elastic components configured for connecting the M first open frame structure and the N second open frame structure.

Preferably, in order to make a symmetric flower stand, the first clamping structure is identical to the second clamping structure, M equals to N.

Preferably, in order to make an asymmetric flower stand, M equals to (N+1).

Preferably, in order to integrate multiple frame structures together, wherein each the M first open frame structure includes two first arms, the M first open frame structure includes a common bar, and wherein the common first bar and the two first arms of each the M first open frame structure are three adjacent edges of a rectangle.

Preferably, in order to provide leg structure corresponding to frame structure to touch one side of the fence, each the M first leg frame structure includes two first legs and a first leg bar for connecting the two first legs.

Preferably, in order to provide more touching force, the flower stand further comprises at least one buffering roll enclosing the first leg bar.

Preferably, in order to efficiently manufacture the flower stand, wherein the two first arms, the two first legs and the first leg bar are made of one wire with identical diameter and identical material.

Preferably, in order to provide more support to flower and/or plant, the flower stand further comprises a common first support bar attached to the M first open frame structures.

Preferably, in order to provide more support to flower and/or plant, wherein the common first support bar further includes at least one protrusion structure.

Preferably, in order to integrate multiple frame structures together, wherein each the N second open frame structure includes two second arms, the N second open frame structure includes a common second bar, and wherein the common second bar and the two second arms are three adjacent edges of a second rectangle.

Preferably, in order to provide leg structure corresponding to frame structure to touch one side of the fence, wherein each the N second leg frame structure includes two second legs and a second leg bar for connecting the two second legs.

Preferably, in order to provide more touching force, the flower stand further comprises at least one buffering roll enclosing the second leg bar.

Preferably, in order to efficiently manufacture the flower stand, wherein the two second arms, the two second legs and the second leg bar are made of one wire with identical diameter and identical material.

Preferably, in order to provide more support to flower and/or plant, the flower stand further comprises a common second support bar attached to the N second open frame structures.

Preferably, in order to provide more support to flower and/or plant, further includes at least one protrusion structure.

Preferably, in order to withstand outdoor or erosive environment and to reduce cost, wherein the flower stand is made of one or any combination of following materials: iron wire; stainless steel wire; galvanized iron wire, plastics, and aluminum wire.

Preferably, in order to provide contraction force by the elastic component, wherein two ends of each of the one or more elastic components are configured for connecting to the common first bar and the common second bar.

Preferably, in order to constrain movement of the first and the second clamping structures, the flower stand further comprises at least one constraining component for enclosing one of the first arms and one of the second arms.

Preferably, in order to fix the container of plants on top of the flower stand, the flower stand further comprises at least one connecting component for connecting the at least one constraining component to a container of plants, wherein the container is deposited on top of the flower stand.

Preferably, in order to place the plants, wherein the container is one of following: a sponge; and a flowerpot.

Preferably, in order to reduce or to alleviate erosion in outdoor environment, wherein the first and the second clamping structures are wrapped with plastic or rubber skin.

Preferably, in order to provide more clamping forces to the fence, wherein a first angle between the M open first open frame structure and the M first leg structure equals to or is less than 90 degrees, and wherein a second angle between the N second open frame structure and the N second leg structure equals to or is less than 90 degrees.

According to an embodiment of the present application, a clamping structure is provided. The clamping structure comprising: M open frame structure, where M is a natural number, wherein each the M open frame structure includes two arms, a common bar is attached to the M open frame structures, wherein the common bar and the two first arms of each the M frame structure are three adjacent edges of a rectangle; and M leg structure corresponding to the M frame structure, respectively, wherein each the M leg frame structure includes two legs and a leg bar for connecting the two legs, wherein an angle between the M open frame structure and the M leg structure equals to or is less than 90 degrees.

Preferably, in order to efficiently manufacture the clamping structure, wherein the two arms, the two legs and the leg bar are made of one wire with identical diameter and identical material.

The flower stand provided by the present application can firmly deposited on a fence or a stone. With the helps of two clamping structures, the flower stand can resist strong winds in outer door environments. Lengths of leg structures of the flower stand can be adjusted according to weights and/or heights of the flowers/plants on top of the flower stand. Numbers of the frame structures and the leg structures of the flower stand can be adjusted according to length of the fence. Length of arms of the frame structures can be adjusted according to thickness of the fence.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Figure 1:
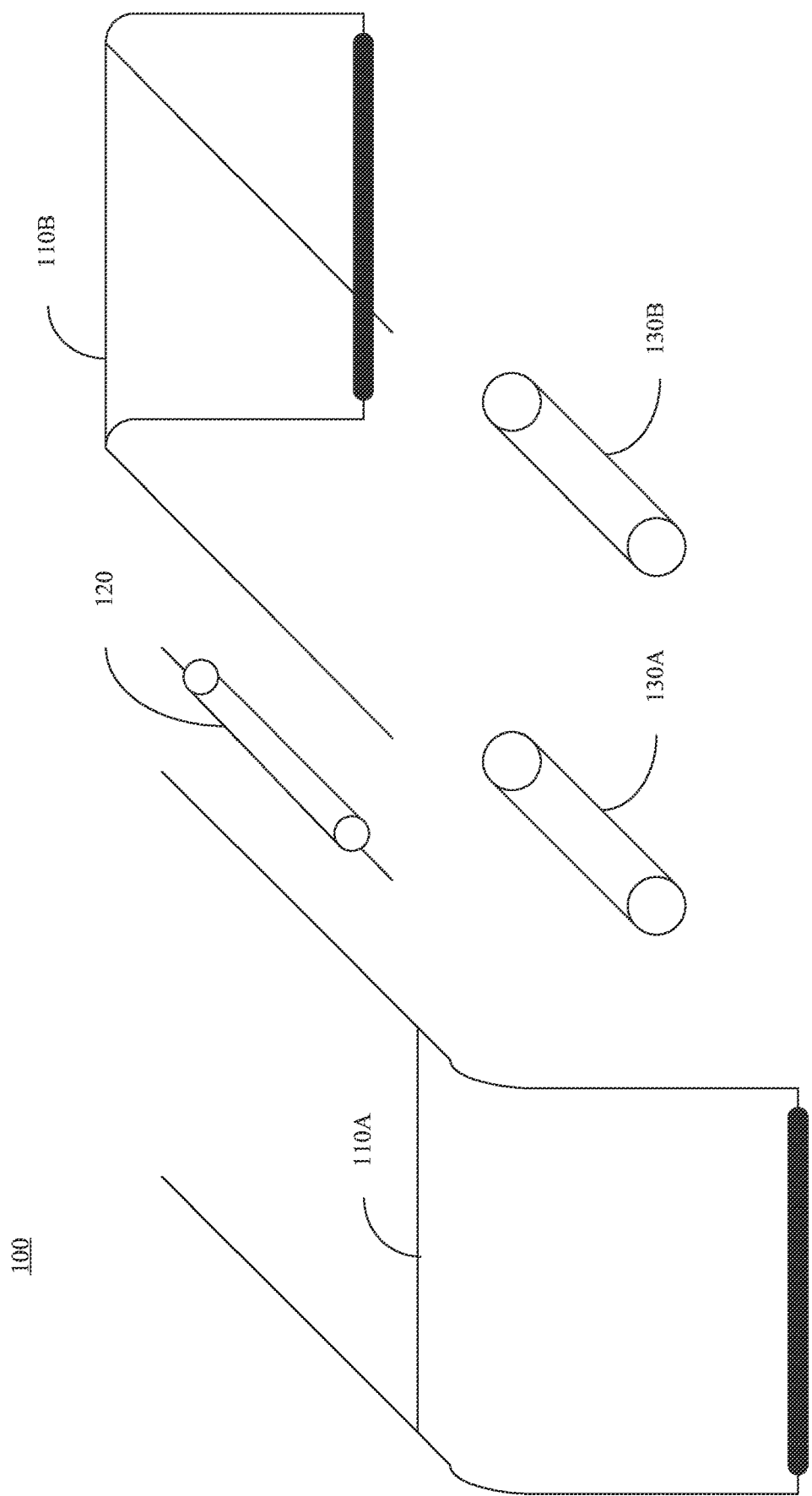
FIG. 1 shows a diagram of components of a flow stand 100 in accordance with an embodiment of the present application.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1, which shows a diagram of components of a flow stand 100 in accordance with an embodiment of the present application. The flower stand 100 comprises two interconnected opposite clamping structures 110A and 110B. The flower stand 100 may be deposited on top of a fence or a stone (e.g., tombstone) with supports of the two clamping structures 110A and 110B. Flowers and plants may be deposited on a container such as a sponge or a flowerpot. The container, i.e., the sponge or the flowerpot, can be fixed on top of the flower stand 100. Thus, even in a windy weather, the sponge or the flowerpot can sit tightly on the fence or the stone.

As shown in FIG. 1, two opposite clamping structures 110A and 110B are connected by at least one elastic component 120 such as a spring. A distance between two legs of the two clamping structures 110A and 110B can be extended by external force. When the external force is gone, the elastic component may bring the two opposite clamping structures 110A and 110B close to each other. Because the two clamping structures 110A and 110B are light weighted, it can be easily extended or contracted. In an extended mode, the distance between two legs of the opposite clamping structures 110A and 110B are longer than the distance in a normal mode. Thickness of fence or stone have to be in between the extended distance and the normal distance. Therefore, the flower stand 100 can sit on top of the fence or the stone.

The flower stand 100 may comprise two clamping structures 110A and 110B, and an elastic component 120 for connecting the two opposite clamping structures 110A and 110B. The first and the second clamping structures 110A and 110B may be structurally and/or materially identical in order to be made conveniently and efficiently. Their legs form a clamp. However, the present application does not limit that the two clamping structures 110A and 110B are structurally and materially identical.

The elastic component 120 may be one or more rubber bands, springs and/or pneumatic cylinders for providing contraction force or relaxation force to the connected clamping structures. The elastic component 120 may be enclosed by a roll to protect the rubber bands, springs, and/or pneumatic cylinders inside.

Optionally, the flower stand 100 may further comprise at least one of two constraining components 130A and 130B for constraining the two clamping structures' movements in an opposite direction. The constraining components 130A and 130B may be two tubes or two hollow rolls, respectively. Inside each of the constraining components 130, an arm of the first clamping structure 110A and another arm of the second clamping structure 110B are constrained. The constraining component 130 may be made of plastic or rubber material. In one embodiment, the constraining component 130 may be a sheet to being rolled for enclosing the two arms of the two clamping structures 110A and 110B inside.

Two ends of the elastic component 120 are attached to two bars of the two clamping structures 110A and 110B, respectively. The bar of the clamping structure 110 is used to connect two arms of the clamping structure 110. Two bars of the clamping structures 110A and 110B are supposed to be in parallel. However, there may be some degrees of manufacturing errors so as that the bars are not exactly in parallel. The manufacturing errors do not affect the function of the elastic component 120. Two ends of the elastic component 120 may be attached to the middle points of the two bars, respectively. When in the extended mode, the distance between the two bars is extended accordingly. Thus, the elastic component 120 is longer in the extended mode. While the elastic component 120 is extended, the elastic component 120 would provide a contraction force to grab the two bars or the two opposite clamping structures 110A and 110B together.

Figure 2:
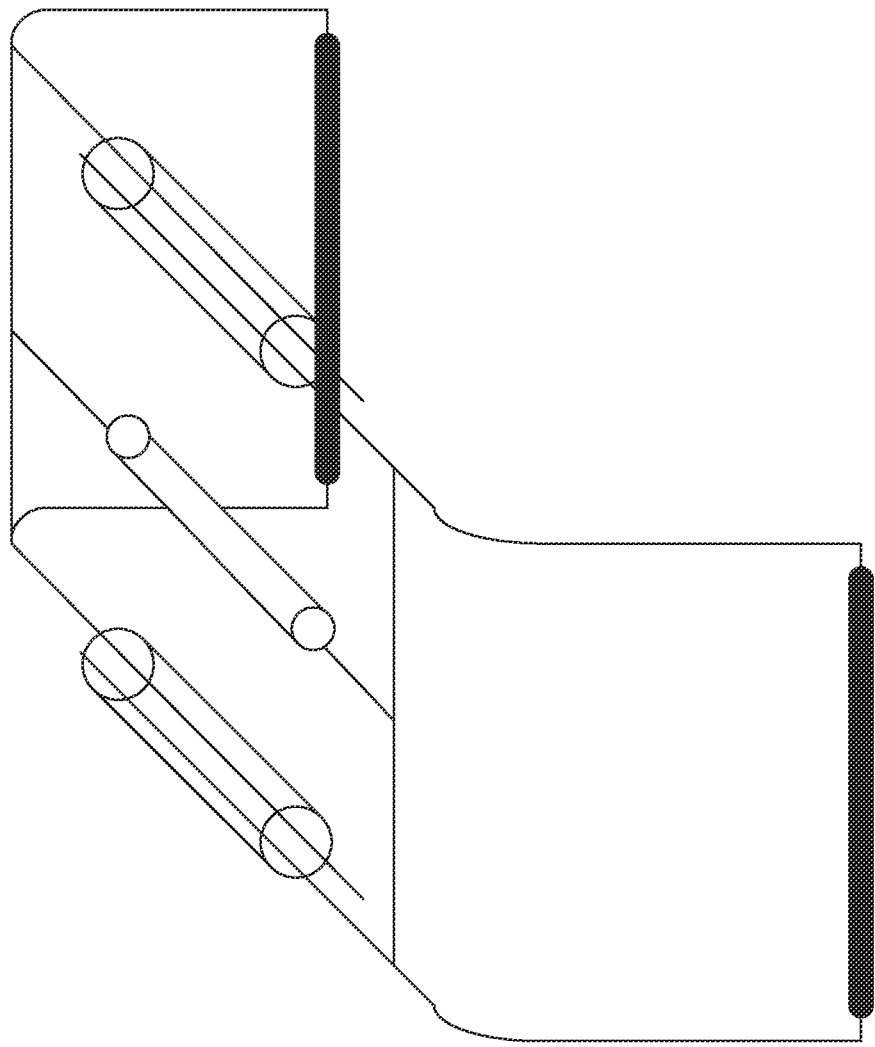
FIG. 2 shows a diagram of the flow stand 100 in accordance with an embodiment of the present application.

Please refer to FIG. 2, which shows a diagram of the flow stand 100 in accordance with an embodiment of the present application. The components as shown in FIG. 1 are assembled as one flower stand 100 as shown in FIG. 2.

As shown in FIGS. 1 and 2, the overall structure of the flower stand 100 is simple, light weighted and effective. The flower stand 100 may comprise three kinds of parts, i.e., the clamping structure 110, the elastic component 120 and the optional constraining component 130. It is easy to manufacture and assembly these parts together. Thus, the assembly time and cost of the flower stand 100 can be reduced accordingly.

Figure 3:
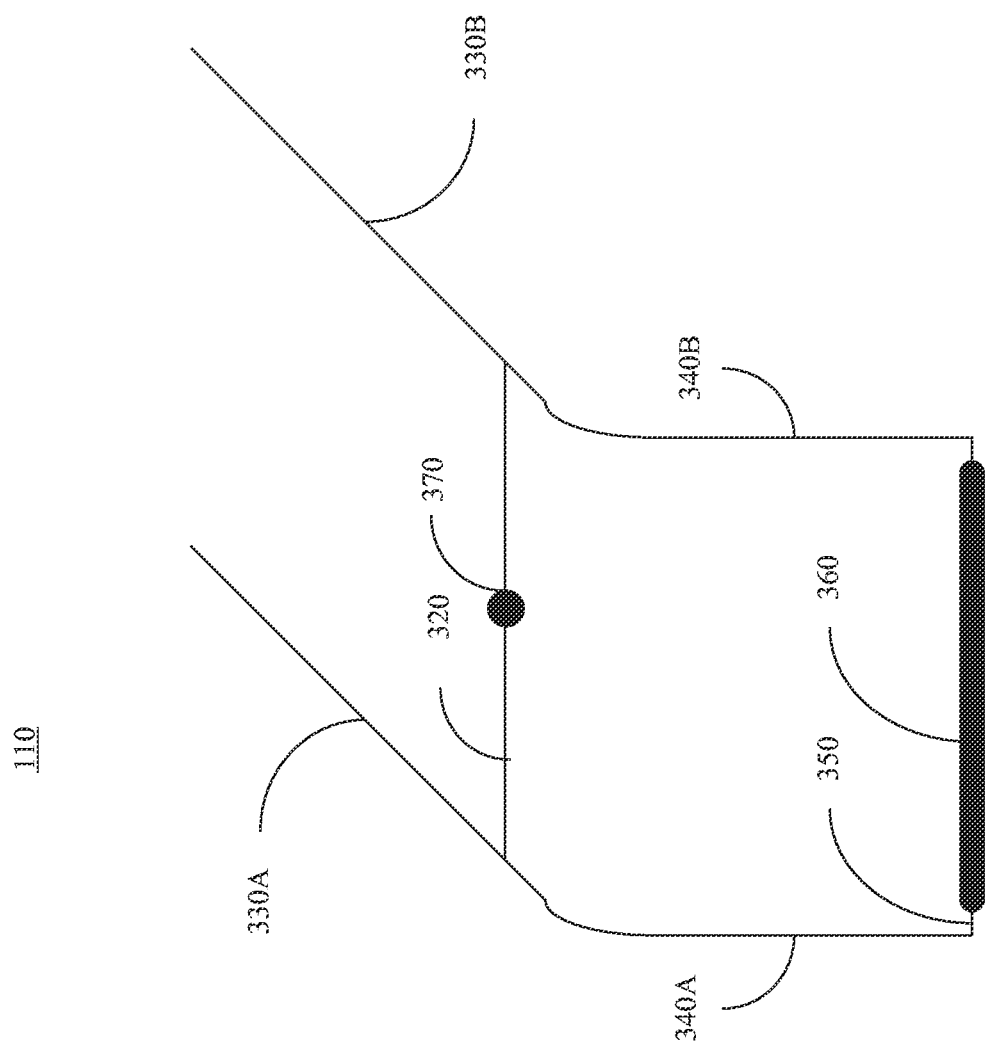
FIG. 3 illustrates a diagram of the clamping structure 110 according to an embodiment of the present application.

Please refer to FIG. 3, which illustrates a diagram of the clamping structure 110 according to an embodiment of the present application. The clamping structure 100 is applicable to the embodiments as shown in FIGS. 1 and 2. The clamping structure 110 may comprise an open frame structure and a leg structure. The open frame structure is open in one direction to another clamping structure 110 of the flower stand 100. The open frame structure may comprise a bar 320, a first arm 330A, and a second arm 330B. The leg structure may comprise a first leg 340A, a second leg 340B, and a leg bar 350. Optionally, there may be at least one buffering roll 360 enclosing at least one part of the leg bar 350.

The open frame structure and/or the flower stand 100 may be made of one or any combination of following material such as iron wire, stainless steel wire, galvanized iron wire, plastics, and/or aluminum wire. The open frame structure may be painted or be enclosed by a plastic skin in order to protect the inside core material from being rusted. The present application does not limit that all of the frame structure are made of same materials.

In one embodiment, the bar 320 may be also welded to the arms 330A and 330B. In alternative embodiments, there are holes at corresponding positions of the arms 330A and 330B. Thus, the bar 320 may go through the holes of the arms 330A and 330B. In some embodiments, there are holes at corresponding positions of the bar 320. Thus, the arms 330A and 330B may go through the holes of the bar 320. The present application does not limit how to join the bar 320 and the arms 320A and 320B.

The leg structure may be extended from the open frame structure. In some embodiments, the first leg 340A and the first arm 330A are made by one wire; and the second leg 340B and the second arm 340B are made by one wire, too. A wire may be made of identical diameter of identical material. A wire may be bent to make the first leg 340A and the first arm 330A. A wire may be bent to make the second leg 340B and the second arm 330B. Thus, there may be a curve section where the wire is bent. A first angle between the first leg 340A and the first arm 330A may equals to or be less than 90 degrees to clamp the fence or the stone tighter. Similarly, a second angle between the second leg 340B and the second arm 330B may equals to or be less than 90 degrees in order to clamp the fence or the stone stronger. The first angle may be identical to the second angle.

In one embodiment, the first leg 340A, the leg bar 350 and the second leg 340B may be made by one wire. In an alternative embodiment, the first leg bar 350 is welded to the first and the second leg 340A and 340B, respectively. In some embodiments, the leg bar 350 is welded to the first leg 340A and the second leg 340B. In alternative embodiments, there are holes at corresponding positions of the first and the second legs 340A and 340B. The leg bar 350 may go through the holes of the first and the second legs 340A and 340B. In some embodiments, there are holes at corresponding positions of the leg bar 350. The first and the second legs 340A and 340B may go through the holes of the leg bar 350, respectively.

The leg structure 340 and/or the flower stand 100 may be made of one or any combination of following material such as iron wire, stainless steel wire, galvanized iron wire, plastics, and/or aluminum wire. The frame structure may be painted or be enclosed by a plastic skin in order to protect the inside core material from being rusted. The present application does not limit that all of the leg structure are made by same materials. An end of the elastic component 120 is mounted to a connection point 370 of the bar 320. The connection point 370 may be in the middle of the bar 320.

Figure 4:
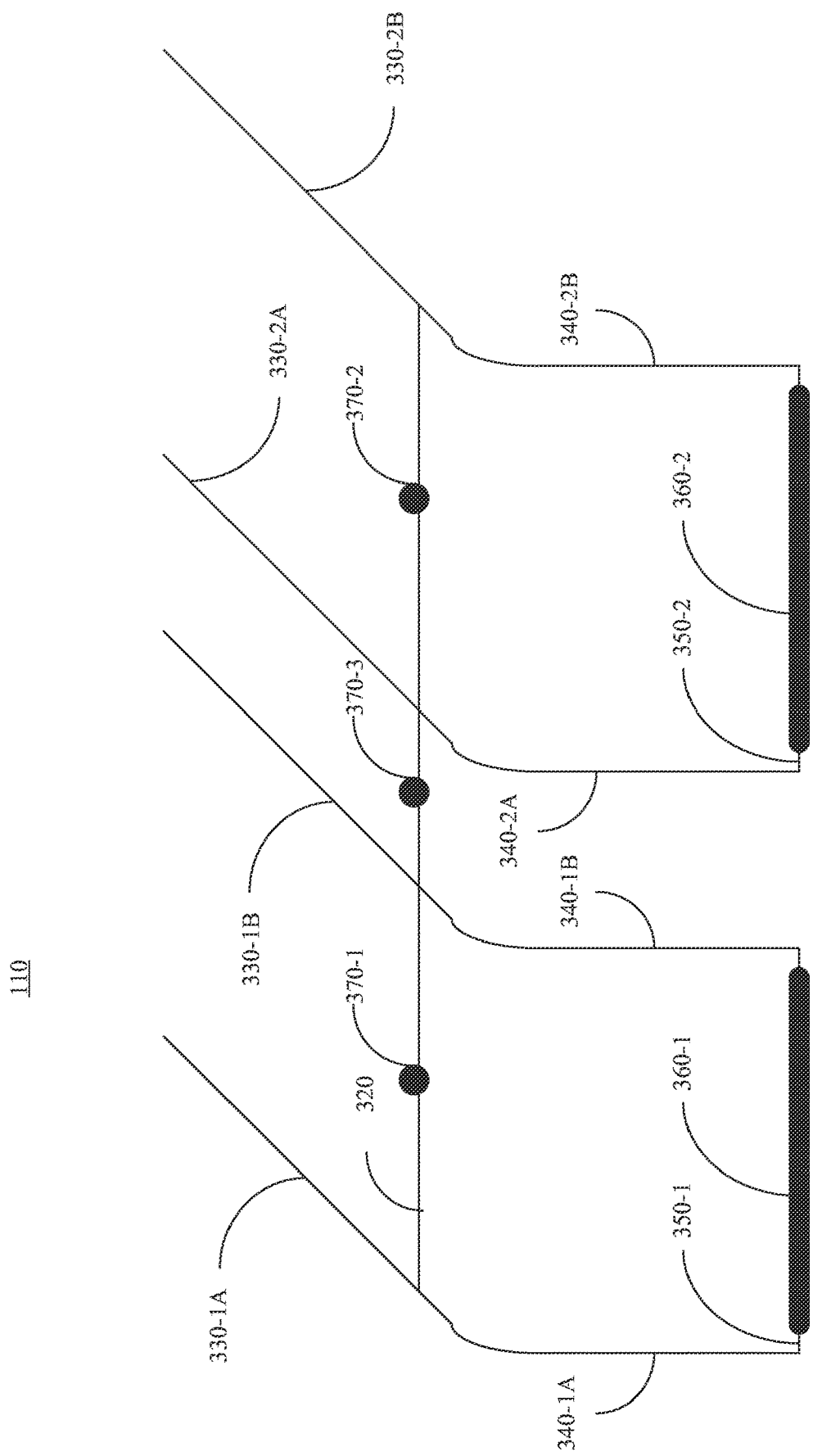
FIG. 4 illustrates a diagram of the clamping structure 110 according to another embodiment of the present application.

Please refer to FIG. 4, which illustrates a diagram of the clamping structure 110 according to an embodiment of the present application. Comparing with the embodiment as shown in FIG. 3, the clamping structure 110 as shown in FIG. 4 includes two open frame structures and two corresponding leg structures. The two open frame structures are connected by a common bar 320. Person having ordinary skill in the art can understand that there may be N open frame structures and N corresponding leg structures in one clamping structure, where N is a natural number. All the open frame structures are approximately identical or similar in size. And all the leg structures are approximately identical or similar in size.

In one embodiment, a clamping structure having N open frame structures may be connected to N ends of elastic components. As shown in FIG. 4, two connection points 370-1 and 370-2 of the two open frame structures are used to connect to two elastic components, respectively. In an alternative embodiment, a clamping structure having N frame structures may be connected to only one end of an elastic component. As shown in FIG. 4A, a connection point 370-3 at the middle position of the fore bar 310 is used to connect to one elastic component. In some embodiments, all three connection points 370-1~370-3 at the bar 320 are used to connect to three elastic components, respectively.

In order to manufacture the clamping structure 110 as shown in FIG. 4 more efficiently, the clamping structure 110 may be made by wires having identical specifications, so as that the bar 320, the arms 330-1A, 330-1B, 330-2A, and 330-2B, the legs 340-1A, 340-1B, 340-2A and 340-2B, and leg bars 350-1 and 350-2 are made of wires with identical diameter and identical material.

Figure 5:
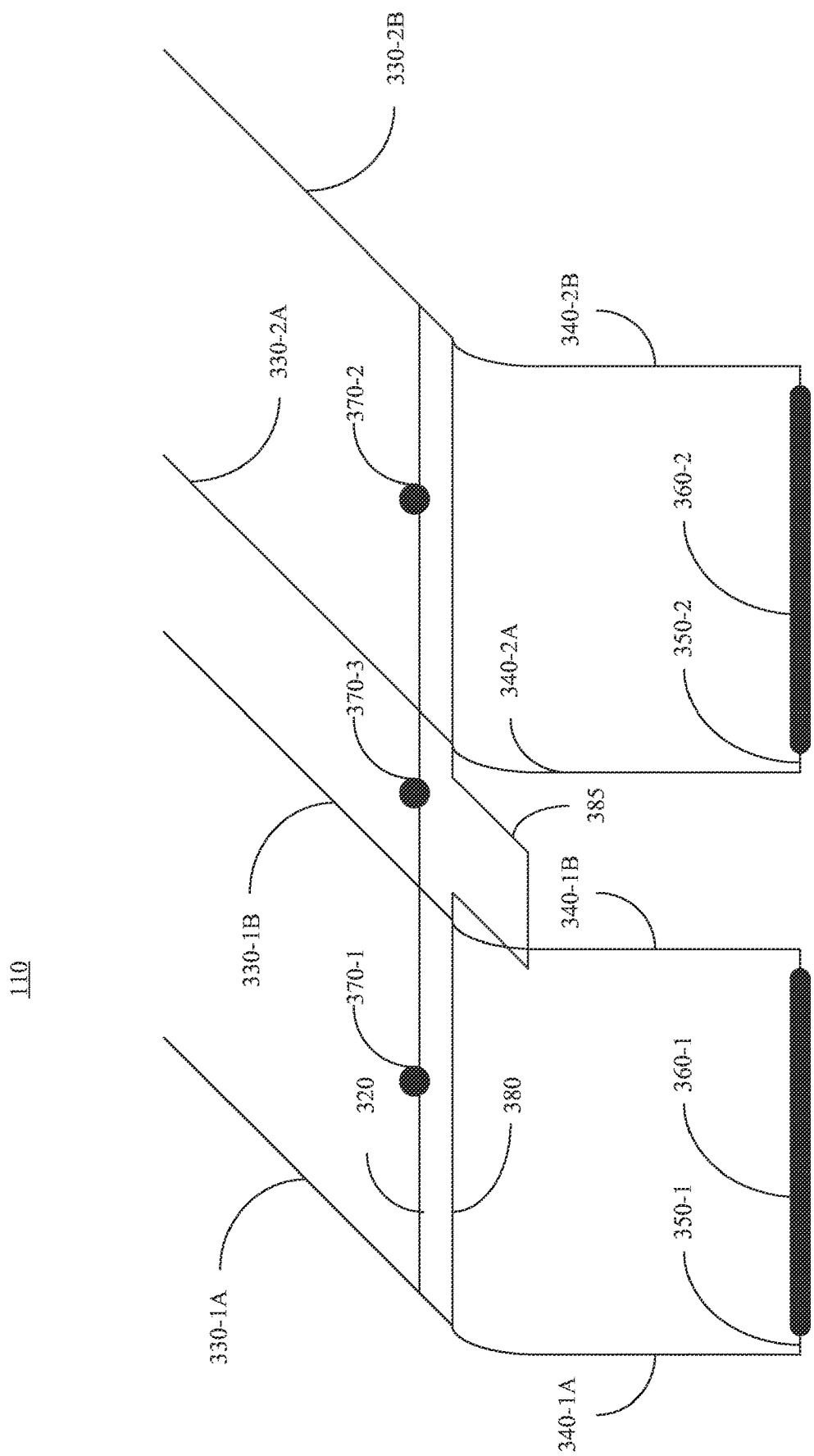
FIG. 5 illustrates a diagram of the clamping structure 110 according to another embodiment of the present application.

Please refer to FIG. 5, which illustrates a diagram of the clamping structure 110 according to an embodiment of the present application. Comparing with the embodiment as shown in FIG. 4, a support bar 380 is added to connect the leg structures in the embodiment as shown in FIG. 4. The support bar 380 may include one or more protrusion structures 385 to further support flower and/or plant being placed above. Furthermore, the bar 320 and the support bar 380 may make the open frame structures more rigid or stronger.

The common support bar 380 may be weld to the arms or the legs. The material of the support bar 380 may be identical to other components such as the bar 320, the arms and the legs.

Figure 6A:
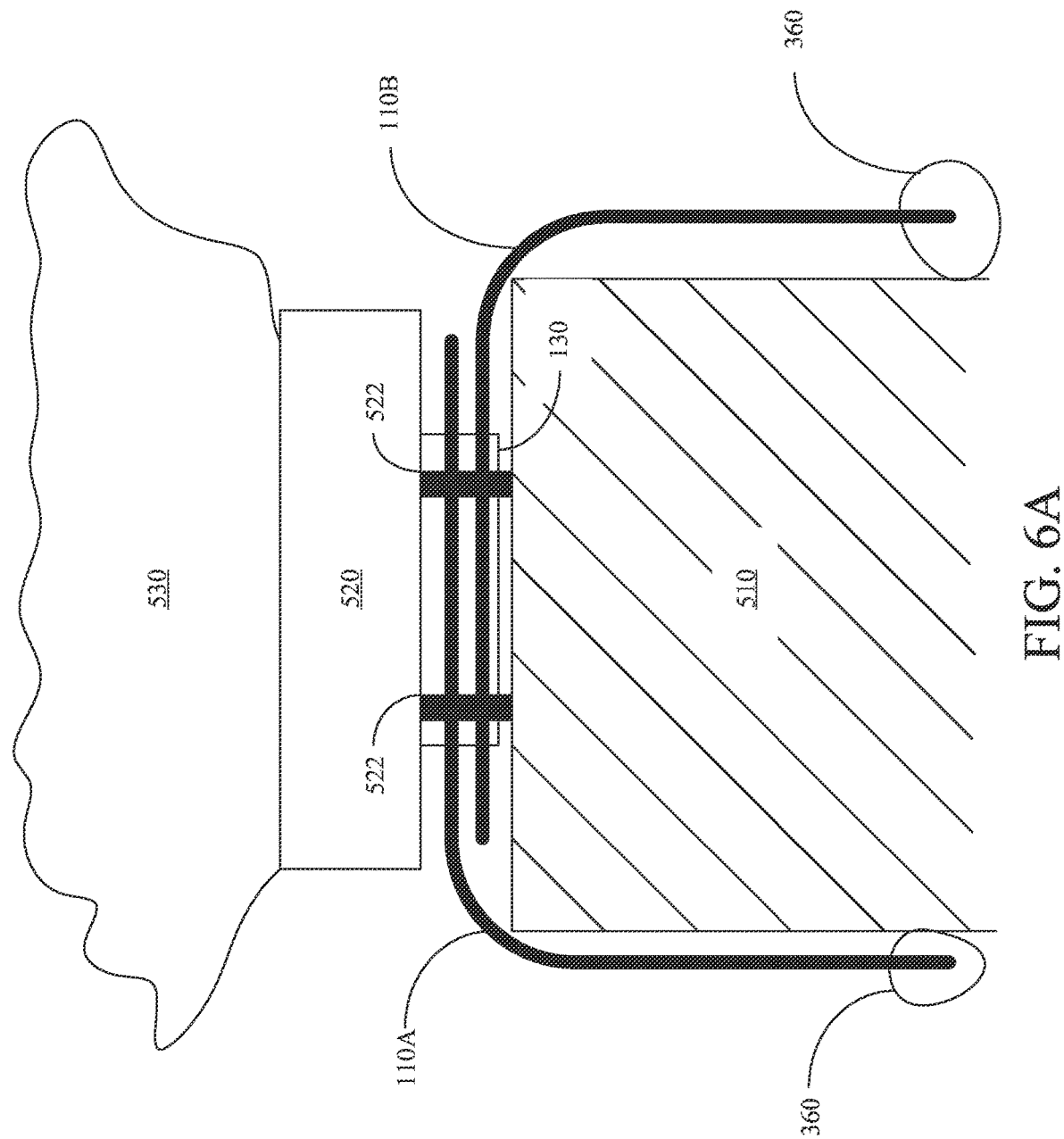
FIG. 6A illustrates a sectional diagram of the flower stand 100 according to an embodiment of the present application.

Please refer to FIG. 6A, which illustrates a sectional diagram of the flower stand 100 according to an embodiment of the present application. The flower stand 100 is deposited on a fence or a stone (hereinafter, fence 510). Two clamping structures 110A and 110B of the flower stand 100 are used to clamp the fence 510.

As shown in FIG. 6A, a first clamping structure 110A is op top of a second clamping structure 110B. The two clamping structures 110A and 110B are connected by at least one elastic component which is unseen in FIG. 5A. At least one elastic component 120 may be attached to the bars of the two clamping structures 110A and 110B.

There is at least one constraining component 130 used to enclose one arm of the first clamping structure 110A and another arm of the second clamping structure 110B together. Therefore, the flower stand 100 can be extended horizontally to be sit on top of the fence 510. Once the flower stand 100 is correctly positioned on top of the fence 510, the elastic component 120 would pull the two clamping structures 110A and 110B close up to each other.

Flower and/or plants 530 are placed in a container such as a sponge or a flowerpot (hereinafter, container 520). There is at least one connecting component 522 for connecting the constraining component 130 and the container 520. There may be one constraining component 130 corresponding to one arm 330 of each clamping structure 110. For example, a first constraining component 130 is corresponding to the outer arm 330-1A of the first open frame structure and a second constraining component 130 is corresponding to the outer arm 330-2B of the second open frame structure. In another example, a first constraining component 130 is corresponding to the inner arm 330-1B of the first open frame structure and a second constraining component 130 is corresponding to the inner arm 330-2A of the second open frame structure. In some examples, there are four constraining components 130 corresponding to the four arms 330-1A, 330-1B, 330-2A and 330-2B. The present application does not limit how many constraining components 130 and connecting components 522 do the flower stand 100 comprise if the connecting components 522 corresponding to the constraining components 130 can firmly fix the sponge 510 on top of the flower stand 100.

Figure 6B:
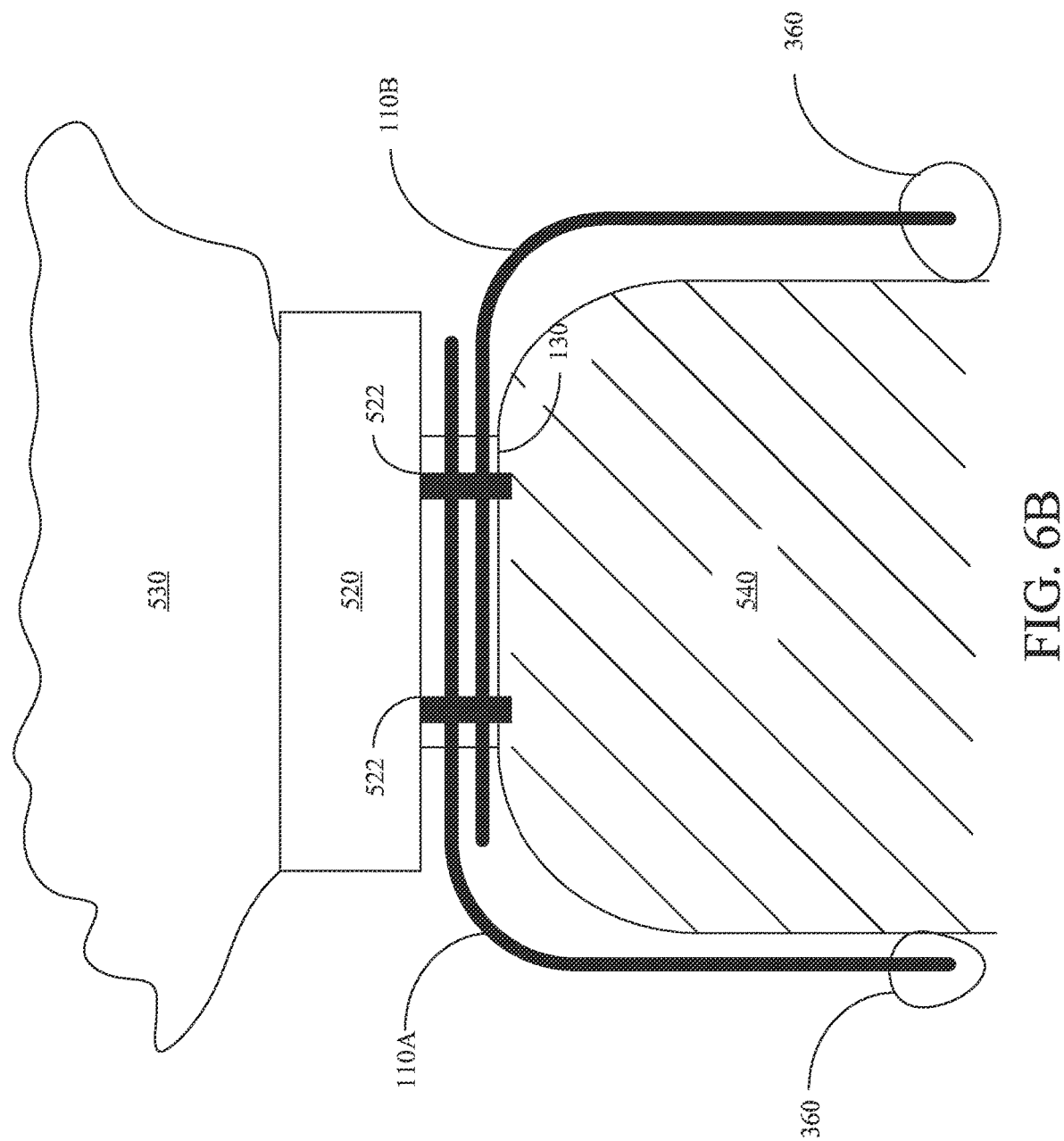
FIG. 6B illustrates a sectional diagram of the flower stand 100 applicable to another fence 540 according to an embodiment of the present application.

Please refer to FIG. 6B, which illustrates a sectional diagram of the flower stand 100 applicable to another fence 540 according to an embodiment of the present application. Comparing with the fence 510 as shown in FIG. 6A, top of the fence 540 as shown in FIG. 6B is rounded. Thanks to the leg structures, the flower stand 100 can still sit firmly on top of the rounded fence 540.

In one embodiment, a flower stand 100 may be asymmetric. For example, the flower stand 100 may comprise a first clamping structure as shown in FIG. 3 and a second clamping structure as shown in FIG. 4. In one embodiment, a first clamping structure 110A may comprise N+1 frame structures and corresponding N+1 leg structures, where N is a natural number. A second clamping structure 110B may comprise N frame structure and corresponding N leg structure. The frame and leg structures of the two clamping structures 110A and 110B may be interleaved. In alternative embodiments, the present application does not limit that a first number of frame and leg structures of the first clamping structure 110A equals to a second number of frame and leg structure of the second clamping structure 110B.

According to an embodiment of the present application a flower stand being deposited on top of a fence is provided. The flower stand, comprising: a first clamping structure, further comprises M first open frame structure and M first leg structure, where M is a natural number, wherein the M first leg structure is configured for touching a first side of the fence; a second clamping structure, further comprises N second open frame structure and N second leg structure, where N is a natural number, wherein the N second leg structure is configured for touching a second side of the fence, the first and the second sides are opposite sides of the fence, wherein the first and the second clamping structures are in opposite directions; and one or more elastic components configured for connecting the M first open frame structure and the N second open frame structure.

Preferably, in order to make a symmetric flower stand, the first clamping structure is identical to the second clamping structure, M equals to N.

Preferably, in order to make an asymmetric flower stand, M equals to (N+1).

Preferably, in order to integrate multiple frame structures together, wherein each the M first open frame structure includes two first arms, the M first open frame structure includes a common bar, and wherein the common first bar and the two first arms of each the M first open frame structure are three adjacent edges of a rectangle.

Preferably, in order to provide leg structure corresponding to frame structure to touch one side of the fence, each the M first leg frame structure includes two first legs and a first leg bar for connecting the two first legs.

Preferably, in order to provide more touching force, the flower stand further comprises at least one buffering roll enclosing the first leg bar.

Preferably, in order to efficiently manufacture the flower stand, wherein the two first arms, the two first legs and the first leg bar are made of one wire with identical diameter and identical material.

Preferably, in order to provide more support to flower and/or plant, the flower stand further comprises a common first support bar attached to the M first open frame structures.

Preferably, in order to provide more support to flower and/or plant, wherein the common first support bar further includes at least one protrusion structure.

Preferably, in order to integrate multiple frame structures together, wherein each the N second open frame structure includes two second arms, the N second open frame structure includes a common second bar, and wherein the common second bar and the two second arms are three adjacent edges of a second rectangle.

Preferably, in order to provide leg structure corresponding to frame structure to touch one side of the fence, wherein each the N second leg frame structure includes two second legs and a second leg bar for connecting the two second legs.

Preferably, in order to provide more touching force, the flower stand further comprises at least one buffering roll enclosing the second leg bar.

Preferably, in order to efficiently manufacture the flower stand, wherein the two second arms, the two second legs and the second leg bar are made of one wire with identical diameter and identical material.

Preferably, in order to provide more support to flower and/or plant, the flower stand further comprises a common second support bar attached to the N second open frame structures.

Preferably, in order to provide more support to flower and/or plant, further includes at least one protrusion structure.

Preferably, in order to withstand outdoor or erosive environment and to reduce cost, wherein the flower stand is made of one or any combination of following materials: iron wire; stainless steel wire; galvanized iron wire, plastics, and aluminum wire.

Preferably, in order to provide contraction force by the elastic component, wherein two ends of each of the one or more elastic components are configured for connecting to the common first bar and the common second bar.

Preferably, in order to constrain movement of the first and the second clamping structures, the flower stand further comprises at least one constraining component for enclosing one of the first arms and one of the second arms.

Preferably, in order to fix the container of plants on top of the flower stand, the flower stand further comprises at least one connecting component for connecting the at least one constraining component to a container of plants, wherein the container is deposited on top of the flower stand.

Preferably, in order to place the plants, wherein the container is one of following: a sponge; and a flowerpot.

Preferably, in order to reduce or to alleviate erosion in outdoor environment, wherein the first and the second clamping structures are wrapped with plastic or rubber skin.

Preferably, in order to provide more clamping forces to the fence, wherein a first angle between the M first open frame structure and the M first leg structure equals to or is less than 90 degrees, and wherein a second angle between the N second open frame structure and the N second leg structure equals to or is less than 90 degrees.

According to an embodiment of the present application, a clamping structure is provided. The clamping structure comprising: M open frame structure, where M is a natural number, wherein each the M open frame structure includes two arms, a common bar is attached to the M open frame structures, wherein the common bar and the two first arms of each the M frame structure are three adjacent edges of a rectangle; and M leg structure corresponding to the M frame structure, respectively, wherein each the M leg frame structure includes two legs and a leg bar for connecting the two legs, wherein an angle between the M open frame structure and the M leg structure equals to or is less than 90 degrees.

Preferably, in order to efficiently manufacture the clamping structure, wherein the two arms, the two legs and the leg bar are made of one wire with identical diameter and identical material.

The flower stand provided by the present application can firmly deposited on a fence or a stone. With the helps of two clamping structures, the flower stand can resist strong winds in outer door environments. Lengths of leg structures of the flower stand can be adjusted according to weights and/or heights of the flowers/plants on top of the flower stand. Numbers of the frame structures and the leg structures of the flower stand can be adjusted according to length of the fence. Length of arms of the frame structures can be adjusted according to thickness of the fence.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A flower stand for supporting flowers on top of a fence, comprising:
    a first clamping structure, comprising a first open frame structure including a first arm, and a first leg structure, wherein the first leg structure is configured for touching a first side of the fence;
    a second clamping structure, comprising a second open frame structure including a second arm, and a second leg structure, wherein the second leg structure is configured for touching a second side of the fence, and the first and the second sides are opposite sides of the fence; and
    an elastic component configured for connecting the first open frame structure and the second open frame structure;
    wherein the first arm and the second arm are attached to each other over a top of the fence to provide support for holding flowers, wherein when the first clamping structure and the second clamping structure are clamping on the fence, the first leg structure and the second leg structure are attached to the first side of the fence and the second side of the fence respectively.

2. The flower stand of claim 1, wherein the first clamping structure is identical to the second clamping structure, and the first clamping structure comprises a plurality of first open structures.

3. The flower stand of claim 1, wherein the first clamping structure comprises M first open frame structures, the second clamping structure comprises N second open frame structures, and M equals to (N+1).

4. The flower stand of claim 1, wherein the first clamping structure comprises M first open frame structures and the second clamping structure comprises N second open frame structures;
    wherein each of the M first open frame structures includes two first arms, and a common first bar that connects to each of the M first open frame structures; and
    wherein the common first bar and the two first arms of each of the M first open frame structures form three adjacent edges of a rectangle.

5. The flower stand of claim 4, wherein each of the M first leg structures includes two first legs and a first leg bar for connecting the two first legs.

6. The flower stand of claim 5, further comprising at least one buffering roll enclosing the first leg bar.

7. The flower stand of claim 5, wherein the two first arms, the two first legs and the first leg bar are made of one wire having a uniform diameter.

8. The flower stand of claim 4, wherein each of the N second open frame structures includes two second arms, and a common second bar connects to each of the N open frame structures, and
    wherein the common second bar and the two second arms form three adjacent edges of a second rectangle.

9. The flower stand of claim 8, wherein each the N second leg structures includes two second legs and a second leg bar for connecting the two second legs.

10. The flower stand of claim 9, further comprises at least one buffering roll enclosing the second leg bar.

11. The flower stand of claim 9, wherein the two second arms, the two second legs and the second leg bar are made of one wire having a uniform diameter.

12. The flower stand of claim 8, further comprises a common second support bar attached to the N second open frame structures.

13. The flower stand of claim 12, wherein the common second support bar further includes at least one protrusion structure.

14. The flower stand of claim 8, wherein two ends of each elastic component are configured for connecting to the common first bar and the common second bar.

15. The flower stand of claim 8, further comprises at least one constraining component for enclosing one of the first arms and one of the second arms.

16. The flower stand of claim 15, further comprises at least one connecting component for connecting the at least one constraining component to a container of plants, wherein the container is deposited on top of the flower stand.

17. The flower stand of claim 16, wherein the container is one of following:
    a sponge; and
    a flowerpot.

18. The flower stand of claim 1, further comprises a common first support bar attached to the first open frame structure.

19. The flower stand of claim 18, wherein the common first support bar further includes at least one protrusion structure.

20. The flower stand of claim 1, wherein the flower stand is made of one or any combination of following materials:
- iron wire;
- stainless steel wire;
- galvanized iron wire;
- plastics; and
- aluminum wire.

21. The flower stand of claim 1, wherein the first and the second clamping structures are wrapped with plastic or rubber skin.

22. The flower stand of claim 1, wherein a first angle between the first open frame structure and the first leg structure equals to or is less than 90 degrees, and
   wherein a second angle between the second open frame structure and the second leg structure equals to or is less than 90 degrees.

* * * * *